(12) United States Patent
Wen et al.

(10) Patent No.: US 12,242,151 B2
(45) Date of Patent: Mar. 4, 2025

(54) DISPLAY PANEL AND MANUFACTURING METHOD THEREOF AND DISPLAY DEVICE

(71) Applicant: Guangzhou China Star Optoelectronics Semiconductor Display Technology Co., LTD., Guangdong (CN)

(72) Inventors: Hailong Wen, Guangdong (CN); Yuxiu Zhang, Guangdong (CN)

(73) Assignee: Guangzhou China Star Optoelectronics Semiconductor Display Technology Co., LTD., Guangzhou (CN)

( * ) Notice: Subject to any disclaimer, the term of this patent is extended or adjusted under 35 U.S.C. 154(b) by 0 days.

(21) Appl. No.: 17/780,156

(22) PCT Filed: May 20, 2022

(86) PCT No.: PCT/CN2022/094186
§ 371 (c)(1),
(2) Date: Nov. 2, 2023

(87) PCT Pub. No.: WO2023/206667
PCT Pub. Date: Nov. 2, 2023

(65) Prior Publication Data
US 2024/0184160 A1    Jun. 6, 2024

(30) Foreign Application Priority Data
Apr. 27, 2022  (CN) .......................... 202210456521.2

(51) Int. Cl.
*G02F 1/1335*    (2006.01)
*G02F 1/1339*    (2006.01)

(52) U.S. Cl.
CPC .. *G02F 1/133516* (2013.01); *G02F 1/133512* (2013.01); *G02F 1/13394* (2013.01); *G02F 1/13396* (2021.01)

(58) Field of Classification Search
CPC ......... G02F 1/133516; G02F 1/133512; G02F 1/133514; G02F 1/13396; G02F 1/13394
(Continued)

(56) References Cited

U.S. PATENT DOCUMENTS 6,671,025 B1 * 12/2003 Ikeda .................. G02F 1/13394
                                                      349/110
7,245,345 B2 *  7/2007 Sawasaki .............. G02F 1/1393
                                                      349/110
(Continued)

FOREIGN PATENT DOCUMENTS

CN    102129136    7/2011
CN    103257482    8/2013
(Continued)

OTHER PUBLICATIONS

International Search Report and the Written Opinion Dated Dec. 21, 2022 From the International Searching Authority Re. Application No. PCT/CN2022/094186 and Its Translation Into English. (18 Pages).
(Continued)

*Primary Examiner* — Dung T Nguyen
*Assistant Examiner* — David Y Chung

(57) ABSTRACT

A display panel, a manufacturing method thereof, and a display device are provided. The display panel includes a color filter substrate. The color filter substrate includes a substrate layer, a black matrix, a first color resist layer, a second color resist layer, and a spacer. The first color resist layer is filled in an opening in the black matrix and covers the black matrix. The second color resist layer is disposed on
(Continued)

the first color resist layer and corresponds to the black matrix. The spacer is disposed on the second color resist layer. A projection of the spacer on the substrate layer is within a projection range of the black matrix on the substrate layer.

4 Claims, 4 Drawing Sheets

(58) Field of Classification Search
USPC .................................. 349/106, 110, 155, 156
See application file for complete search history.

(56) References Cited

U.S. PATENT DOCUMENTS

| | | | |
|---|---|---|---|
| 7,799,392 B2* | 9/2010 | Yoon | B82Y 20/00 349/110 |
| 2014/0036189 A1 | 2/2014 | Yi et al. | |
| 2016/0103353 A1* | 4/2016 | Kim | G02F 1/13394 349/42 |

FOREIGN PATENT DOCUMENTS

| | | |
|---|---|---|
| CN | 104133325 | 11/2014 |
| CN | 205539834 | 8/2016 |
| CN | 106292042 | 1/2017 |
| CN | 107255896 | 10/2017 |
| CN | 108196394 | 6/2018 |
| CN | 108873449 | 11/2018 |
| CN | 109143692 | 1/2019 |
| CN | 208705625 | 4/2019 |
| CN | 208780957 | 4/2019 |
| CN | 208953832 | 6/2019 |
| CN | 110764306 | 2/2020 |
| CN | 112666742 | 4/2021 |
| JP | 2002-006132 | 1/2002 |
| JP | 2016-031513 | 3/2016 |

OTHER PUBLICATIONS

Notification of Office Action and Search Report Dated Apr. 27, 2023 From The State Intellectual Property Office of the People's Republic of China Re. Application No. 202210456521.2 and Its Translation Into English. (21 Pages).

Notification of Office Action and Search Report Dated Nov. 24, 2023 From The State Intellectual Property Office of the People's Republic of China Re. Application No. 202210456521.2 and Its Translation Into English. (22 Pages).

* cited by examiner

DISPLAY PANEL AND MANUFACTURING METHOD THEREOF AND DISPLAY DEVICE

RELATED APPLICATIONS

This application is a National Phase of PCT Patent Application No. PCT/CN2022/094186 having International filing date of May 20, 2022, which claims the benefit of priority of Chinese Patent Application No. 202210456521.2 filed on Apr. 27, 2022. The contents of the above applications are all incorporated by reference as if fully set forth herein in their entirety.

FIELD AND BACKGROUND OF THE INVENTION

The present disclosure relates to the field of display technology, and more particularly, to a display panel and a manufacturing method thereof and a display device.

In a thin-film transistor-liquid crystal display (TFT-LCD) driven by a fringe field switching/in plane switching (FFS/IPS) mode, a color filter (CF) substrate production process is generally: black matrix (BM)→red-green-blue (RGB) color resistance→over coat (OC) layer→spacer (PS). A process flow above is a conventional mainstream design flow, which has following problems:
1. An OC process needs to be added to a normal CF process, which increases a cost of equipment and materials;
2. As a substrate layer of the PS, the OC has a relatively low hardness. When the PS is compressed, the OC, serving as the substrate layer, is compressed at a same time, thereby causing insufficient compression resistance of the product; in addition, due to a property of an OC film layer being soft, a high elasticity of a PS material is also limited, so that a deformation ability of a high elastic PS material cannot be easily exerted to the extreme;
3. A flatness of an OC material itself is mediocre, only about 60%-70% of flatness can be achieved. In order to achieve a higher flatness effect, a thickness of the OC layer needs to be increased, or the OC material with a high flatness is introduced, which further increases the cost.

A purpose of the present invention is to provide a display panel, a manufacturing method thereof, and a display device to solve a technical problem of high manufacturing cost, low production efficiency, low product surface flatness, and insufficient compression resistance in a conventional color filter substrate.

SUMMARY OF THE INVENTION

In order to overcome the above-mentioned problems, the present invention provides a display panel including a color filter substrate. The color filter substrate includes a substrate layer, a black matrix, a first color resist layer, a second color resist layer, and a spacer. The black matrix is arranged on the substrate layer and the black matrix is provided with an opening. The first color resist layer is filled in the opening and covering the black matrix. The second color resist layer is disposed on the first color resist layer and corresponding to the black matrix. The spacer is arranged on a surface of the second color resist layer away from the first color resist layer. A projection of the spacer on the substrate layer is located within a projection range of the black matrix on the substrate layer.

Furthermore, the color filter substrate further includes a protective layer disposed on a surface of the first color resist layer away from the black matrix and corresponding to the opening.

Furthermore, a vertical distance between a surface of the protective layer away from the first color resist layer and the surface of the second color resist layer away from the first color resist layer is less than 0.6 micrometer.

Furthermore, a material of the protective layer is same as a material of the spacer.

Furthermore, a plurality of color resist blocks are respectively provided in the first color resist layer and the second color resist layer, and two adjacent color resist blocks arranged in stack have different colors.

Furthermore, the plurality of color resist blocks in the first color resist layer includes a main body portion and an extension portion. The main body portion is located in the opening. The extension portion is arranged on the black matrix and located between two adjacent main body portions. A thickness of the extension portion and a thickness of the black matrix are both less than a thickness of the main body portion. The thickness of the main body portion is less than a sum of the thickness of the black matrix and the thickness of the extension portion.

Furthermore, the spacer includes a main support column and an auxiliary support column, and a height of the auxiliary support column is less than a height of the main support column.

Furthermore, the display panel further includes an array substrate, and the color filter substrate and the array substrate are disposed opposite to each other.

The present invention further provides a manufacturing method of the a display panel, including the following steps: providing a substrate layer; manufacturing a black matrix on the substrate layer and forming an opening in the black matrix; forming a first color resist layer filled in the opening and covering the black matrix; forming a second color resist layer corresponding to the black matrix on the first color resist layer; and forming a spacer on a position of the second color resist layer corresponding to the black matrix.

Furthermore, when forming spacer on the second color resist layer, forming a protective layer corresponding to the opening on the first color resist layer simultaneously.

Furthermore, when forming spacer on the second color resist layer, a step of forming the protective layer corresponding to the opening on the first color resist layer simultaneously includes the following steps: forming a transparent photocurable material layer on the first color resist layer and the second color resist layer; providing a halftone mask, wherein the halftone mask is provided with a first light-transmitting hole, a second light-transmitting hole, and a third light-transmitting hole, the first light-transmitting hole and the second light-transmitting hole correspond to the black matrix, the third light-transmitting hole corresponds to the opening, and a light transmittance of the first light-transmitting hole is less than a light transmittance of the second light-transmitting hole and a light transmittance of the third light-transmitting hole; and patterning the photocurable material layer through the halftone mask, forming a main support column at a position on the photocurable material layer corresponding to the first light-transmitting hole, forming an auxiliary support column at a position on the photocurable material layer corresponding to the second light-transmitting hole, and forming the protective layer at a position on the photocurable material layer corresponding to the third light-transmitting hole.

Furthermore, the light transmittance of the second light-transmitting hole is same as the light transmittance of the third light-transmitting hole.

Furthermore, the black matrix includes a first opening region, a second opening region, and a third opening region, the first opening region is provided with the first opening, the second opening region is provided with the second opening, the third opening region is provided with the third opening, and a step of forming the first color resist layer filled in the opening and covering the black matrix includes: covering a first color resist material on the black matrix; providing a first mask, wherein the first mask is provided with a fourth light-transmitting hole and a fifth light-transmitting hole, a projection of the fourth light-transmitting hole on the substrate layer overlaps with a projection of the first opening region on the substrate layer, and the fifth light-transmitting hole is arranged corresponding to the second opening region and the third opening region; and patterning the first color resist material through the first mask, so as to form a first color resist block in the first opening region and form a second color resist block at a position corresponding to the fifth light-transmitting hole, wherein the second color resist block is located on the black matrix between two adjacent second openings, and located on the black matrix between two adjacent third openings.

Furthermore, a step of forming a second color resist layer corresponding to the black matrix on the first color resist layer includes: covering a second color resist material on the first color resist layer; providing a second mask, wherein the first mask is provided with a sixth light-transmitting hole and a seventh light-transmitting hole, a projection of the sixth light-transmitting hole on the substrate layer overlaps with a projection of the second opening region on the substrate layer, and the seventh light-transmitting hole is arranged corresponding to the first opening region; and patterning the second color resist material through the second mask, so as to form a third color resist block in the second opening region and form a fourth color resist block at a position corresponding to the seventh light-transmitting hole, wherein a projection of the fourth color resist block on the substrate layer is located on the black matrix between two adjacent first openings, and the third resist block covers the second color resist block in the second opening region.

The present invention further provides a display device, the display device includes the display panel and the backlight unit described above, and the display panel and the backlight unit are connected.

Advantages of the present invention: for the display panel, the manufacturing method thereof, and the display device in the present invention, through material properties of the second color resist layer of the color filter substrate, a compression resistance of the display device and a deformation ability and a recovery ability of the spacer are enhanced. In addition, through the second color resist layer, a brightness in a dark state can be reduced while enhancing a light-shielding effect of the color filter substrate, and a contrast ratio of the display device can be enhanced.

BRIEF DESCRIPTION OF THE SEVERAL VIEWS OF THE DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

Components in the figures are shown as follows.

Figure 1:
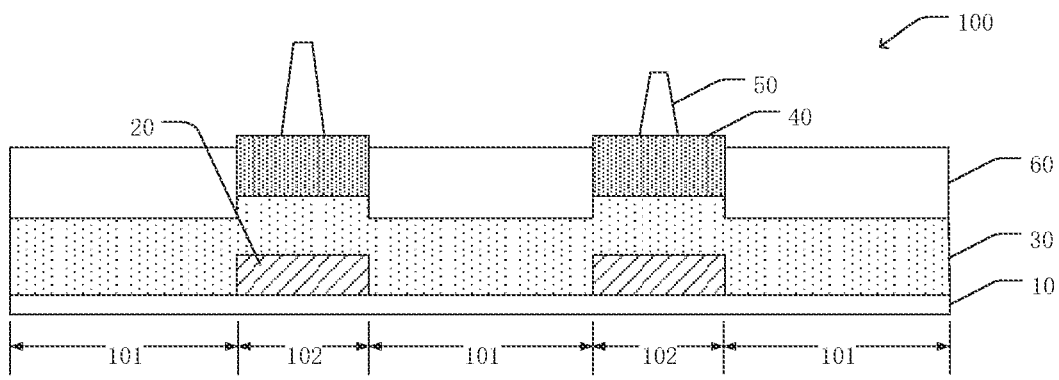
FIG. 1 is a schematic structural view of a film structure of a color filter substrate provided by a first embodiment of the present invention.

color filter substrate 100; light-transmitting region 101;

light shielding region 102; substrate layer 10;

black matrix 20; opening 21;

first color resist layer 30; first color resist block 31;

third color resist block 32; fifth color resist block 33;

main body portion 34; extension portion 35;

second color resist layer 40; second color resist block 41;

fourth color resist block 42;

spacer 50; main support column 51;

auxiliary support column 52; protective layer 60;
first opening region 201; first opening 211;
second opening region 202; second opening 212;
third opening region 203; third opening 213.

DESCRIPTION OF SPECIFIC EMBODIMENTS OF THE INVENTION

A preferred embodiment of the present invention will be introduced with reference to appended drawings as follows to demonstrate that the present invention can be implemented. The embodiment of the present invention can be fully introduced to those skilled in the art to make technical contents clearer and easier to understand. The present invention can be embodied in many different forms of embodiment, and the scope of protection of the present invention is not limited to the embodiments set forth herein.

In the appended drawings, structurally identical components are designated by the same reference numerals, and structurally or functionally similar components throughout are designated by similar numerical reference numerals. The dimensions and thicknesses of each component shown in the drawings are arbitrarily shown. The size and thickness of each component are not limited, and for the sake of clarity, the thickness of the components is exaggerated somewhat in some places in the drawings.

Direction terms mentioned by the present invention, for example "upper," "lower," "front," "rear," "left," "right," "inner," "outer," "side," etc. are merely directions in the appended drawings for only explaining and illustrating the present invention. The orientation or positional relationship is only for the convenience of describing the present invention and simplifying the description, and does not indicate or imply that the device or element referred to must have a specific orientation, structure, and operation in a specific orientation, and should not be viewed as limitations of the present invention. In addition, terms "first," "second," and "third" are configured for descriptive purposes only, and cannot be understood as indicating or implying relative importance or implicitly indicating the number of technical features indicated.

When some part is described to be "on" another part, the part can be directly disposed on the other part; alternatively, an intervening part can exist, the part is disposed on the intervening part, and the intervening part is disposed on the other part. When a part is described to be "installed on" or "connected to" another part, it can be understood that the parts are directly "installed" or "connected" to each other, alternatively it is understood that one part is "installed" or "connected" to the other part through an intervening part.

First Embodiment

An embodiment of the present invention provides a display device, which can be a liquid crystal display device including a display panel and a backlight unit arranged in stack, and the display panel is connected to the backlight unit. The backlight unit is configured to provide a display light for the display panel, and the display panel filters the backlight light according to a control signal to form a specific color display image. The display device can be any display device with a display function, such as a mobile phone, a notebook computer, a tablet computer, etc.

The display panel includes an array substrate, a liquid crystal layer, and a color filter substrate 100 that are sequentially stacked. The liquid crystal layer is filled with a plurality of liquid crystal molecules. The array substrate is configured to control a deflection of the plurality of liquid crystal molecules in each pixel unit, thereby controlling a light transmittance of the backlight light to form a display image. The color filter substrate 100 is configured for filtering light and colorizing the display image.

Figure 2:
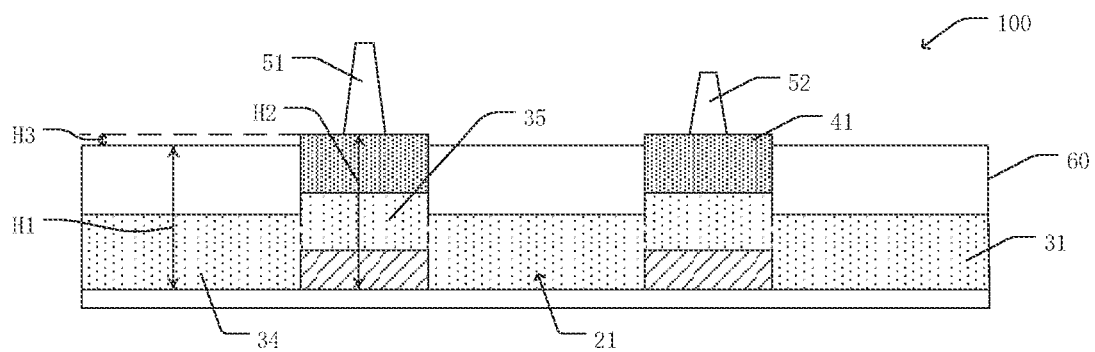
FIG. 2 is a schematic structural view of the film structure of the color filter substrate provided by the first embodiment of the present invention.

As shown in FIGS. 1-2, the color filter substrate 100 has a plurality of light-transmitting regions 101 and a light-shielding region 102 surrounding the light-transmitting regions 101, and two adjacent light-transmitting regions 101 are connected by the light-shielding region 102. Light emitted by the display panel passes through the color filter substrate 100 through the plurality of light-transmitting regions 101 and is converted into light of a specific color to achieve a color display.

The color filter substrate 100 includes a black matrix 20, a first color resist layer 30, a second color resist layer 40, a spacer 50, and a protective layer 60.

The black matrix 20 is disposed on a substrate layer 10 and corresponds to the light-shielding region 102. The black matrix 20 is a mesh structure having a plurality of openings 21, and each of the plurality of light-transmitting regions 101 is provided with one of the plurality of openings 21. The black matrix 20 is manufactured from a black light-shielding material for preventing light in the two adjacent light-transmitting regions 101 from mixing colors and prevent the color filter substrate 100 from leaking light.

The first color resist layer 30 is filled in the plurality of openings 21 and covers a surface of the black matrix 20. The first color resist layer 30 includes a plurality of first color resist blocks 31. Each first color resist blocks 31 includes a main body portion 34 and an extension portion 35, the main body portion 34 is disposed on the substrate layer 10 in each of the plurality of openings 21, and the extension portion 35 is disposed on the surface of the black matrix 20 away from the substrate layer 10. A thickness of the extension portion 35 is less than a thickness of the main body portion 34, which facilitates enhancing a flatness of a surface of the color filter substrate 100. The thickness of the main body portion 34 is greater than a thickness of the black matrix 20, so that a surface of the main body portion 34 away from the substrate layer 10 is higher than the surface of the black matrix 20 away from the substrate layer 10. The main body portion 34 can be connected to the extension portion 35. In addition, the thickness of the main body portion 34 is less than a sum of the thickness of the black matrix 20 and the thickness of the extension portion 35, thereby increasing a thickness of the color filter substrate 100 in the light-shielding region 102 and elevating a base of the spacer 50.

The second color resist layer 40 is located in the light-shielding region 102 and is disposed on a surface of the first color resist layer 30 away from the black matrix 20, and an orthographic projection of the second color resist layer 40 on the substrate layer 10 is located within an orthographic projection range of the black matrix 20 on the substrate layer 10. In addition, in order to save color resist material, an orthographic projection of the second color resist layer 40 on the display panel coincides with an orthographic projection of a gate signal line on the display panel, and an arrangement direction of the second color resist layer 40 is also same as a routing direction of the gate signal line. A plurality of second color resist blocks 41 are also disposed in the second color resist layer 40, and the plurality of second color resist blocks 41 are disposed on a plurality of extension portions 35 of the plurality of first color resist blocks 31. As shown in FIGS. 1-2, the black matrix 20, the plurality of extension portions 35 of the plurality of first color resist blocks 31, and the plurality of second color resist blocks 41 are sequentially stacked, and a width of the plurality of second color resist blocks 41 is less than or equal to a width of the plurality of extension portions 35.

Specifically, the plurality of first color resist blocks 31 and the plurality of second color resist blocks 41 both include red color resist blocks, green color resist blocks, and blue color resist blocks differentiated by colors accordingly. In the first color resist layer 30, color resist blocks of different colors are evenly distributed in the color filter substrate 100, and the display light is filtered by the color resist blocks and light of same colors as the color resist blocks are emitted, so as to colorize the display image.

Colors of the plurality of first color resist blocks 31 and the plurality of second color resist blocks 41 that are arranged in stack are different. For example, a blue second color resist block 41 is disposed on a red first color resist block 31, a red second color resist block 41 is disposed on a green and a blue first color resist block 31. According to a color filtering principle, light filtered by a first color resist block 31 cannot pass through a second plurality of color resist block 41 with a different color. Therefore, arranging the plurality of first color resist blocks 31 and the plurality of second color resist blocks 41 with different colors can enhance a light-shielding effect of the light-shielding region 102 of the color filter substrate 100, reduce a brightness in a dark state, and enhance a contrast ratio of the display device.

In addition, the second color resist layer 40 can further increase a film thickness of the color filter substrate 100 in the light-shielding region 102, and further elevate a height of the spacer 50. In addition, a material of the second color resist layer 40 is a color resist material, and the color resist material has a hardness greater than a hardness of an over coat (OC) layer in the prior art, and has more excellent support ability. The spacer 50 is disposed on the color resist blocks made of the color resist material, and the support ability of the spacer 50 to a panel can be enhanced, thereby enhancing a pressure resistance of the display device, and enhancing a deformation ability and a recovery ability after being pressed of the spacer 50.

The spacer 50 is also located in the light-shielding region 102 and disposed on a surface of the second color resist layer 40 away from the first color resist layer 30. The spacer 50 includes a plurality of main support columns 51 and a plurality of auxiliary support columns 52, and a height of the plurality of auxiliary support columns 52 is lower than a height of the plurality of main support columns 51. The plurality of main support columns 51 are configured for supporting a cell thickness of the liquid crystal layer, so as to maintain a uniform distribution of the liquid crystal molecules in the liquid crystal layer. When the display device is under pressure, the panel is slightly deformed inward. At this time, the plurality of auxiliary support columns 52 and the plurality of main support columns 51 maintain the cell thickness of the liquid crystal layer and share a pressure on the plurality of main support columns 51.

The protective layer 60 is disposed on the first color resist layer 30 and located in the plurality of light-transmitting regions 101. The protective layer 60 is configured for planarizing the surface of the color filter substrate 100, also, buffering and protecting the color filter substrate 100, and preventing a pigment in the first color resist layer 30 from contaminating internal components of the display device after precipitation. Both the protective layer 60 and the spacer 50 are made of transparent photocurable materials, so as to prevent the spacer 50 and the protective layer 60 from affecting a light transmittance of the color filter substrate 100, solve a problem of poor flatness performance of the over coat layer adopting thermal curing material in the prior art, and enhances the flatness of the surface of the color filter substrate 100.

Specifically, as shown in FIG. 2, a sum H1 of a thickness of the protective layer 60 and a thickness of the main body portion 34 of the first color resist block 31 (i.e., a thickness of the color filter substrate 100 in the light-transmitting region 101) is less than or equal to a sum H2 of a thicknesses of the black matrix 20, a thicknesses of the extension portion 35 of the first color resist block 31, and a thicknesses of the second color resist block 41 (i.e., the film thickness of the color filter substrate 100 in the light-shielding region 102), and a vertical distance H3 between a surface of the protective layer 60 away from the first color resist layer 30 (i.e., an upper surface of the protective layer 60) and the surface of the second color resist layer 40 away from the first color resist layer 30 (i.e., an upper surface of the second color resist layer 40) is less than 0.6 micrometer. Preferably, the vertical distance H3 between the upper surface of the protective layer 60 and the upper surface of the second color resist layer 40 is less than or equal to 0.3 micrometer.

An embodiment of the present invention further provides a manufacturing method of a display panel, which is configured to manufacture the display panel as described in a first embodiment of the present invention. The manufacturing method of the display panel includes implementing steps S11-S12.

Figure 3:
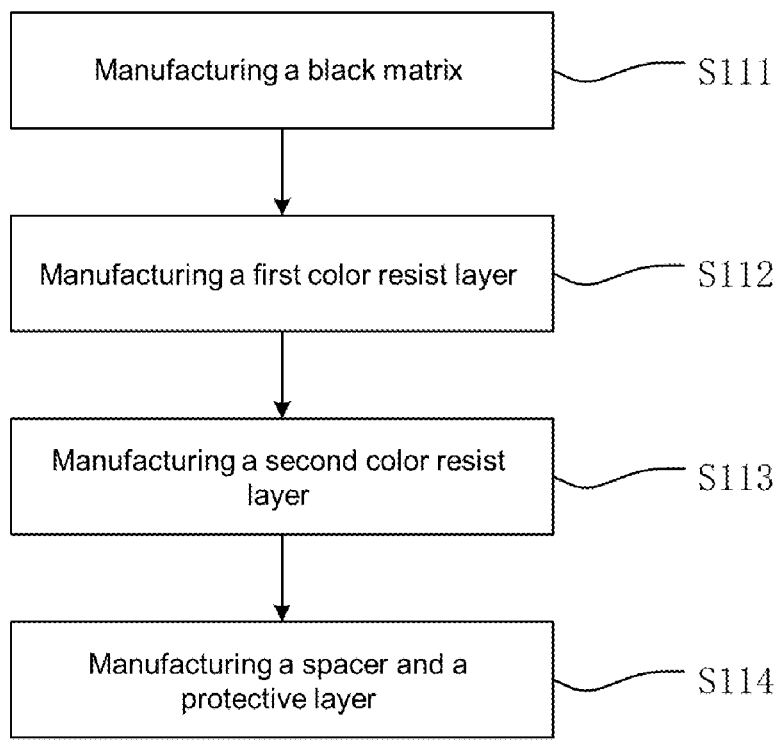
FIG. 3 is a schematic view of a flowchart of a manufacturing method of the color filter substrate provided by the first embodiment of the present invention.

Step S11: manufacturing a color filter substrate 100, as shown in FIG. 3, which includes implementing steps S111-S114.

Step S111: manufacturing a black matrix 20: setting a plurality of light-transmitting regions 101 on a substrate layer 10 and a light-shielding region 102 surrounding each light-transmitting region 101. A black light-shielding material layer is coated and cured on a surface of the substrate layer 10. The black light-shielding material layer is patterned, and an opening 21 penetrating the black light-shielding material layer is formed in each light-transmitting region 101 to form the black matrix 20.

Step S112: manufacturing a first color resist layer 30: forming a plurality of first color resist blocks 31 filled in the opening 21 and covering the black matrix 20 on a surface of the black matrix 20 away from the substrate layer 10 through a color resist process. The first color resist block 31 can differentiated into red color resist blocks, green color resist blocks, and blue color resist blocks by colors accordingly.

Step S113: manufacturing a second color resist layer 40: forming a plurality of second color resist blocks 41 in the light-shielding region 102 on a surface of the first color resist layer 30 away from the black matrix 20 through the color resist process again. A color of the second color resist block 41 is different from the color of an adjacent first color resist block 31 (i.e., the first color resist block 31 in contact with the second color resist block 41 that are arranged in stack). For example, the second color resist block 41 formed on a red color resist block in the first color resist layer 30 is blue, and the second color resist block 41 formed on a green color resist block and a blue color resist block in the first color resist layer 30 is red.

In addition, a mask configured for manufacturing the second color resist layer 40 is different from a mask configured for manufacturing the first color resist layer 30. Through holes of the mask configured for manufacturing the first color resist layer 30 correspond to a coincident position of the light-transmitting region 101 of the substrate layer 10 and an orthographic projection of the color resist blocks and a gate signal line in the second color resist layer 40 on the display panel, and through holes of the mask configured for manufacturing the second color resist layer 40 correspond to the light shielding regions 102 of the substrate layer 10.

Step S114: manufacturing a spacer 50 and a protective layer 60: forming a transparent photocurable material layer on the surface of the first color resist layer 30 and a surface of the second color resist layer 40 away from the black matrix 20, patterning the photocurable material layer through a halftone exposure process, forming a plurality of main support columns 51 and a plurality of auxiliary support columns 52 on the second color resist layer 40 in the light-shielding region 102, and forming the protective layer 60 on the first color resist layer 30 in the plurality of light-transmitting regions 101.

Specifically, a halftone mask adopted in the halftone exposure process has a first light-transmitting hole, a second light-transmitting hole, and a third light-transmitting hole. The first light-transmitting hole and the second light-transmitting hole correspond to the black matrix 20, and the third light-transmitting hole correspond to the plurality of openings 21 in the black matrix 20. The first light-transmitting hole is configured to form a pattern of the plurality of main support columns 51, the second light-transmitting hole is configured to form a pattern of the plurality of auxiliary support columns 52, and the third light-transmitting hole is configured to form a pattern of the protective layer 60. A light transmittance of the first light-transmitting hole is less than a light transmittance of the second light-transmitting hole and a light transmittance of the third light-transmitting hole, such that a height of the plurality of main support columns 51 formed through the first light-transmitting hole is greater than a height of the plurality of auxiliary support columns 52 formed through the second light-transmitting hole, thereby forming a level difference between the plurality of main support columns 51 and the plurality of auxiliary support columns 52. The light transmittance of the second light-transmitting hole is equal to the light transmittance of the third light-transmitting hole, so that the height of the plurality of auxiliary support columns 52 formed through the second light-transmitting hole is equal to a thickness of the protective layer 60 formed through the third light-transmitting hole.

Step S12: forming a liquid crystal layer on an array substrate. The color filter substrate 100 and the array substrate are aligned with each other, and the color filter substrate 100 is fixed on a side of the liquid crystal layer away from the array substrate.

Embodiments of the present invention provide the display panel and the display device. Through adding the second color resist layer with a color different from a color of the first color resist layer in the light-shielding region of the color filter substrate, the light shielding effect of the color filter substrate is enhanced. In addition, the brightness of the dark state is reduced, and the contrast ratio of the display device is enhanced. In addition, the second color resist layer can also enhance the pressure resistance of the display device and the deformation ability and the recovery ability after being pressed of the spacer according to its material properties.

In addition, in an embodiment of the present invention, the over coat layer manufactured through adopting the thermal curing material in the prior art is replaced with the protective layer having a same material as the spacer, so that the flatness of the surface of the color filter substrate can be enhanced while being capable of molded in one piece with the spacer, thereby omitting a thermal curing process in the prior art, reducing manufacturing processes, saving a cost of materials and equipment, and enhancing a production capacity and efficiency of a production line.

Second Embodiment

An embodiment of the present invention provides a manufacturing method of a display panel, which is configured to manufacture the display panel described in the first embodiment of the present invention. The manufacturing method of the display panel includes implementing steps S21-S22.

Figure 4:
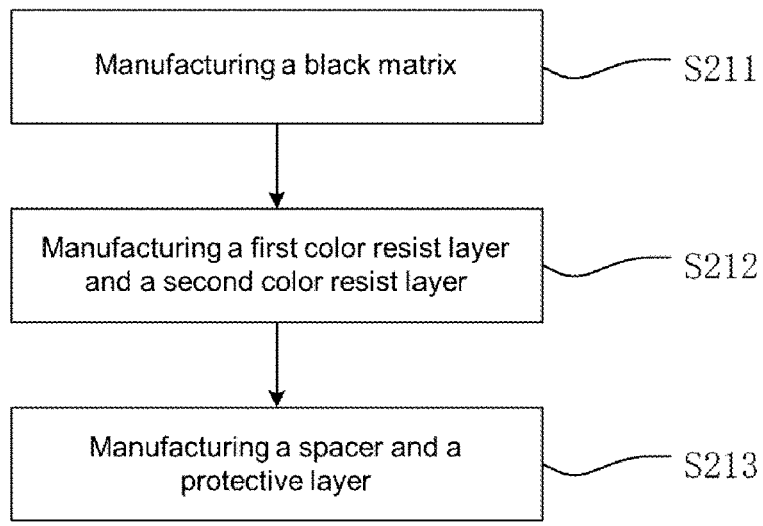
FIG. 4 is a schematic view of a flowchart of a manufacturing method of the color filter substrate provided by a second embodiment of the present invention.

Step S21: manufacturing a color filter substrate, as shown in FIG. 4, which includes implementing steps S211-S213.

Step S211: manufacturing a black matrix: setting a plurality of light-transmitting regions and a light-shielding region surrounding each light-transmitting region on a substrate layer. A black light-shielding material layer is coated and cured on a surface of the substrate layer. The black light-shielding material layer is patterned, and an opening penetrating through the black light-shielding material layer is formed in each light-transmitting region to form the black matrix.

Step S212: manufacturing the first color resist layer and the second color resist layer.

Figure 5:
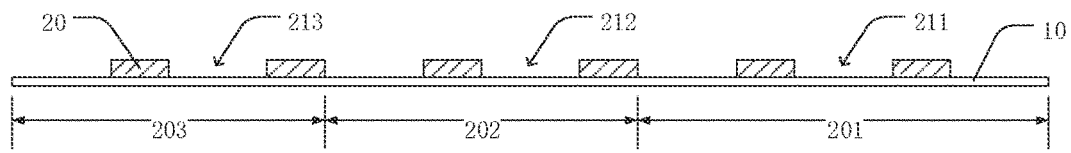
FIG. 5 is a schematic view of regions of a black matrix in step S212 provided by the second embodiment of the present invention.

As shown in FIG. 5, a plurality of openings 21 in the black matrix 20 are divided into a plurality of first openings 211, a plurality of second openings 212, and a plurality of third openings 213. The plurality of first openings 211 are located in a first opening region 201, the plurality of second openings 212 are located in a second opening region 202, and the plurality of third openings 213 are located in a third opening region 203. The plurality of first openings 211 in the first opening region 201 are to be configured to fill red color resist blocks, the plurality of second openings 212 in the second opening region 202 are to be configured to fill blue color resist blocks, and the plurality of third openings 213 in the third opening region 203 are to be configured to fill green color resist blocks.

Figure 6:
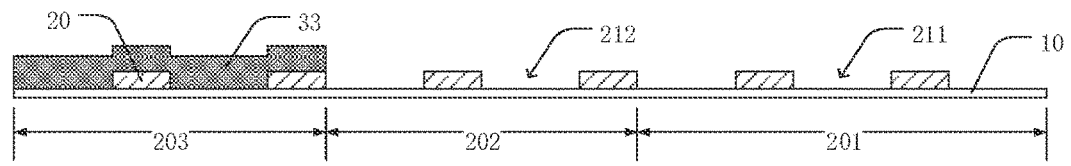
FIG. 6 is a schematic view of a film structure of the color filter substrate after forming a fifth color resist block in step S212 provided by the second embodiment of the present invention.

A surface of the black matrix 20 away from the substrate layer 10 is covered with a third color resist material, and a third color resist material layer is patterned through a third mask with an eighth light-transmitting hole. The eighth light-transmitting hole coincides with an orthographic projection of the third opening region 203 on the substrate layer 10. Therefore, as shown in FIG. 6, a plurality of fifth color resist blocks 33 corresponding to the eighth light-transmitting hole are formed in the third opening region 203. The plurality of fifth color resist blocks 33 are the green color resist blocks in the first color resist layer 30, which fill the plurality of third openings 213 and cover the black matrix 20 in the third opening region 203.

Figure 7:
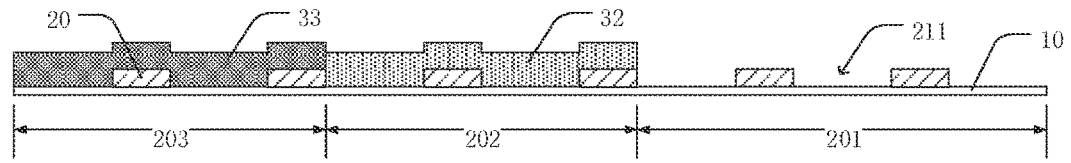
FIG. 7 is a schematic view of the film structure of the color filter substrate after forming a third color resist block in step S212 provided by the second embodiment of the present invention.

The surface of the black matrix 20 away from the substrate layer 10 is covered with a second color resist material, and a second color resist material layer is patterned through a second mask with a sixth light-transmitting hole. The sixth light-transmitting hole coincides with an orthographic projection of the second opening region 202 on the substrate layer 10. Therefore, as shown in FIG. 7, a plurality of third color resist blocks 32 corresponding to the six light-transmitting hole are formed in the second opening region 202. The plurality of third color resist blocks 32 are the blue color resist blocks in the first color resist layer 30, which fill the plurality of second openings 212 and cover the black matrix 20 in the second opening region 202.

Figure 8:
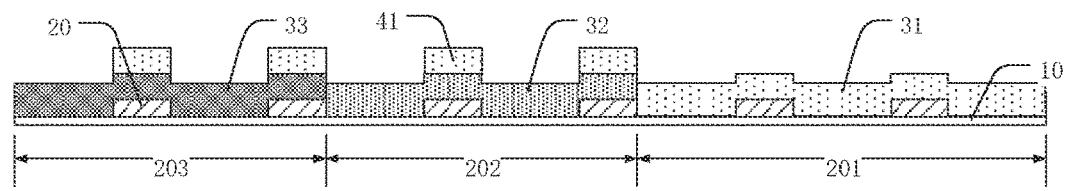
FIG. 8 is a schematic view of the film structure of the color filter substrate after forming a first color resist block and a second color resist block in step S212 provided by the second embodiment of the present invention.

A first color resist material is covered on the surface of the black matrix 20 away from the substrate layer 10, the plurality of third color resist blocks 32, and the plurality of fifth color resist blocks 33, and the first color resist material layer is patterned through a first mask having the fourth light-transmitting hole and the fifth light-transmitting hole. The fourth light-transmitting hole coincides with an orthographic projection of the first opening region 201 on the substrate layer 10, and the fifth light-transmitting hole coincides with an orthographic projection of the second opening region 202 and an orthographic projection of the third opening region 203 on the substrate layer 10. Therefore, as shown in FIG. 8, the plurality of first color resist blocks 31 corresponding to the fourth light-transmitting hole are formed in the first opening region 201. The plurality of second color resist blocks 41 corresponding to the fifth light-transmitting hole are formed in the second opening region 202 and the third opening region 203. The plurality of first color resist blocks 31 are the red color resist blocks in the first color resist layer 30, which fill the plurality of first openings 211 and cover the black matrix 20 in the first opening region 201. The plurality of second color resist blocks 41 are the red color resist blocks in the second color resist layer 40, which are located on the plurality of second color resist blocks 41 and the plurality of third color resist blocks 32. In addition, in the second opening region 202, an orthographic projection of the plurality of second color resist blocks 41 on the substrate layer 10 is located on the black matrix 20 between two adjacent second openings 212. In the third opening region 203, the orthographic projection of the plurality of second color resist blocks 41 on the substrate layer 10 is located on the black matrix 20 between two adjacent third openings 213.

Figure 9:
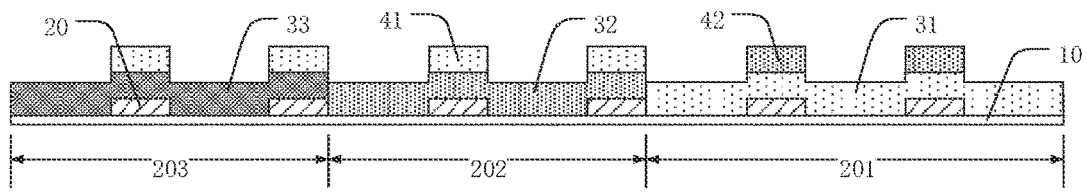
FIG. 9 is a schematic view of the film structure of the color filter substrate after forming a fourth color resist block in step S212 provided by the second embodiment of the present invention.

A surface of the plurality of first color resist blocks 31 away from the black matrix 20 is covered with a third color resist material, and the third color resist material layer is patterned through a fourth mask with a seventh light-transmitting hole. The seventh light-transmitting hole coincides with the orthographic projection of the first opening region 201 on the substrate layer 10. Therefore, as shown in FIG. 9, the plurality of fourth color resist blocks 42 corresponding to the seven light-transmitting hole are the blue color resist blocks in the second color resist layer 40, which are located on the plurality of first color resist blocks 31, and an orthographic projection of the plurality of fourth color resist blocks 42 on the substrate layer 10 is located on the black matrix 20 between two adjacent first openings 211.

Step S213: manufacturing a spacer and a protective layer: forming a transparent photocurable material layer on the surface of the first color resist layer and a surface of the second color resist layer away from the black matrix, patterning the photocurable material layer through a halftone exposure process, forming a plurality of main support columns and a plurality of auxiliary support columns on the second color resist layer in the light-shielding region, and forming the protective layer on the first color resist layer in the plurality of light-transmitting regions.

Step S22: forming a liquid crystal layer on an array substrate. The color filter substrate and the array substrate are aligned with each other, and the color filter substrate is fixed on a side of the liquid crystal layer away from the array substrate.

In the manufacturing method of the display panel provided in an embodiment of the present invention, the plurality of first color resist blocks and the plurality of second color resist blocks of a same color are simultaneously formed in a same process through a same mask, and a portion of the color resist blocks in the second color resist layer can be manufactured when manufacturing the first color resist layer, and only four color resist processes are adopted for manufacturing the first color resist layer and the second color resist layer. Compared with the manufacturing method of the display panel provided in the first embodiment of the present invention, steps of the manufacturing method is further reduced, and a production capacity and efficiency of a production line are enhanced.

Third Embodiment

An embodiment of the present invention provides a manufacturing method of a display panel.

An embodiment of the present invention provides the manufacturing method of the display panel configured for manufacturing the display panel. A difference between the display panel manufactured in this embodiment of the present invention and the display panel provided in the first embodiment is that the red color resist blocks in the second color resist layer are located between the first color resist layer and the black matrix.

In addition to the above-mentioned difference, a structure of the display panel manufactured in this embodiment of the present invention is similar to a structure of the display panel provided in the first embodiment, and will not be reiterated herein.

Specifically, the manufacturing method of the display panel includes implementing steps S31-S32.

Figure 10:
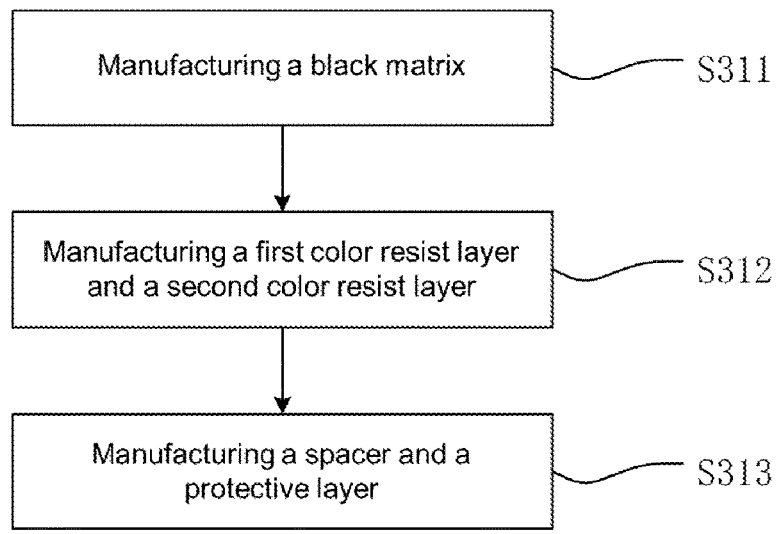
FIG. 10 is a schematic view of a flowchart of the manufacturing method of the color filter substrate provided by a third embodiment of the present invention.

Step S31: manufacturing a color filter substrate, as shown in FIG. 10, which includes implementing steps S311-S313.

Step S311: manufacturing a black matrix: setting a plurality of light-transmitting regions and a light-shielding region surrounding each light-transmitting region on a substrate layer. A black light-shielding material layer is coated and cured on a surface of the substrate layer. The black light-shielding material layer is patterned, and an opening penetrating through the black light-shielding material layer is formed in each light-transmitting region to form the black matrix.

Step S312: manufacturing the first color resist layer and the second color resist layer.

Figure 11:
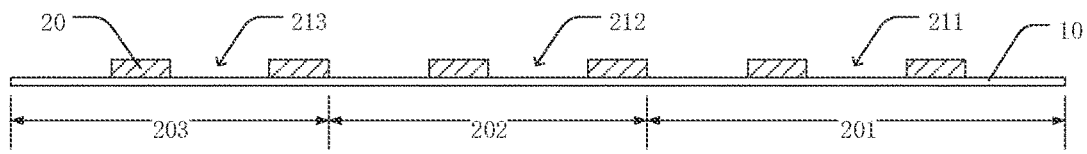
FIG. 11 is a schematic view of regions of a black matrix in step S312 provided by the third embodiment of the present invention.

As shown in FIG. 11, a plurality of openings 21 in the black matrix 20 are divided into a plurality of first openings 211, a plurality of second openings 212, and a plurality of third openings 213. The plurality of first openings 211 are located in a first opening region 201, the plurality of second openings 212 are located in a second opening region 202, and the plurality of third openings 213 are located in a third opening region 203. The plurality of first openings 211 in the first opening region 201 are to be configured to fill red color resist blocks, the plurality of second openings 212 in the second opening region 202 are to be configured to fill blue color resist blocks, and the plurality of third openings 213 in the third opening region 203 are to be configured to fill green color resist blocks.

Figure 12:
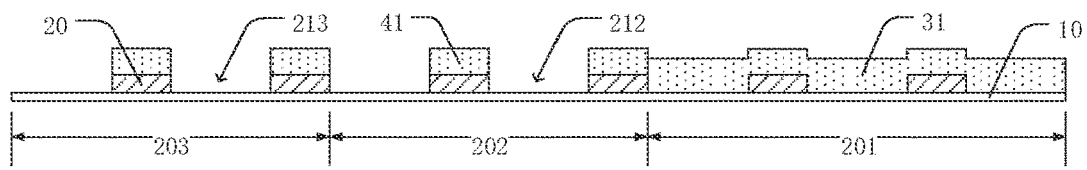
FIG. 12 is a schematic view of a film structure of the color filter substrate after forming a first color resist block and a second color resist block in step S312 provided by the third embodiment of the present invention.

A surface of the black matrix 20 away from the substrate layer 10 is covered with a first color resist material, and a first color resist material layer is patterned through a first mask with a fourth light-transmitting hole and a fifth light-transmitting hole. The fourth light-transmitting hole coincides with an orthographic projection of the first opening region 201 on the substrate layer 10, and the fifth light-transmitting hole coincides with an orthographic projection of the second opening region 202 and an orthographic projection of the third opening region 203 on the substrate layer 10. Therefore, as shown in FIG. 12, a plurality of first color resist blocks 31 corresponding to the fourth light-transmitting hole are formed in the first opening region 201, and a plurality of second color resist blocks 41 corresponding to the fifth light-transmitting hole are formed in the second opening region 202 and the third opening region 203. The plurality of first color resist blocks 31 are the red color resist blocks in the first color resist layer 30, which fill the plurality of first openings 213 and cover the black matrix 20 in the first opening region 201. The plurality of second color resist blocks 41 are the red color resist blocks in the second color resist layer 40, which is located on the black matrix 20 between two adjacent second openings 212 and between two adjacent third openings 213.

Figure 13:
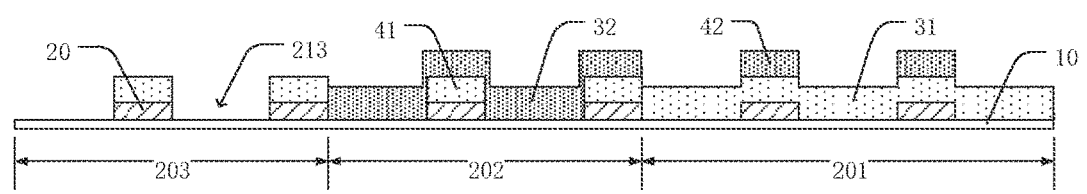
FIG. 13 is a schematic view of the film structure of the color filter substrate after forming a third color resist block and a fourth color resist block in step S312 provided by the third embodiment of the present invention.

The surface of the black matrix 20 away from the substrate layer 10, the plurality of first color resist blocks 31, and the plurality of second color resist blocks 41 are covered with a second color resist material, and a second color resist material layer is patterned through a second mask with a sixth light-transmitting hole and a seventh light-transmitting hole. The sixth light-transmitting hole coincides with an orthographic projection of the second opening region 202 on the substrate layer 10, and the seventh light-transmitting hole coincides with the orthographic projection of the first opening region 201 on the substrate layer 10. Therefore, as shown in FIG. 13, a plurality of third color resist blocks 32 corresponding to the six light-transmitting hole are formed in the second opening region 202, and a plurality of fourth color resist blocks 42 corresponding to the seventh light-transmitting hole are formed in the first opening region 201. The plurality of third color resist blocks 32 are the blue color resist blocks in the first color resist layer 30, which fill the plurality of second openings 212 and cover the black matrix 20 in the second opening region 202. The plurality of fourth color resist blocks 42 are the blue color resist blocks in the second color resist layer 40, which are located on the plurality of first color resist blocks 31, and an orthographic projection of the plurality of fourth color resist blocks 42 on the substrate layer 10 is located on the black matrix 20 between two adjacent first openings 211.

Figure 14:
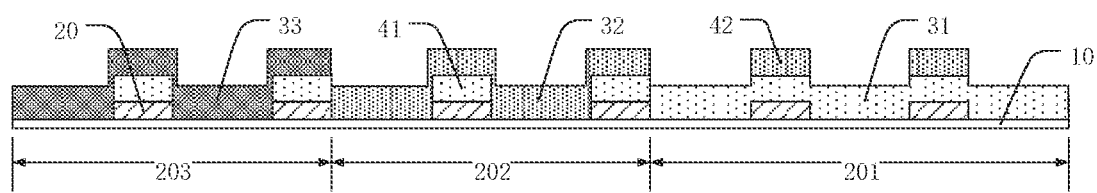
FIG. 14 is a schematic view of the film structure of the color filter substrate after forming a fifth color resist block in step S312 provided by the third embodiment of the present invention.

A third color resist material is covered on the surface of the black matrix 20 away from the substrate layer 10 and the plurality of third color resist blocks 41 in the third opening region 203, and a third color resist material layer is patterned through a third mask having the eighth light-transmitting hole. The eighth light-transmitting hole coincides with the orthographic projection of the third opening region 203 on the substrate layer 10. Therefore, as shown in FIG. 14, the plurality of fifth color resist blocks 33 corresponding to the eighth light-transmitting hole are formed in the third opening region 203. The plurality of fifth color resist blocks 33 are the green color resist blocks in the first color resist layer 30, which fill the plurality of third openings 213 and cover the plurality of second color resist blocks 41 in the third opening region 203.

Step S313) manufacturing a spacer and a protective layer: forming a transparent photocurable material layer on the surface of the first color resist layer and a surface of the second color resist layer away from the black matrix, patterning the photocurable material layer through a halftone exposure process, forming the protective layer on the first color resist layer in the plurality of light-transmitting regions, and forming a plurality of main support columns and a plurality of auxiliary support columns on the second color resist layer in the light-shielding region. In the first opening region, the plurality of main support columns and the plurality of auxiliary support columns are located on the second color resist layer. In the second opening region and the third opening region, the plurality of main support columns and the plurality of auxiliary support columns are located on the first color resist layer, and the plurality of main support columns and the plurality of auxiliary support columns coincide with an orthographic projection of the second color resist layer on the substrate layer.

Step S32: forming a liquid crystal layer on an array substrate. The color filter substrate and the array substrate are aligned with each other, and the color filter substrate is fixed on a side of the liquid crystal layer away from the array substrate.

The manufacturing method of the display panel provided in this embodiment of the present invention is a most preferred embodiment. The first plurality of color resist blocks, the plurality of second color resist blocks, the plurality of third color resist blocks, and the plurality of fourth color resist blocks of a same color are formed simultaneously in a same process through a same mask. A portion of the second color resist blocks in the second color resist layer can be manufactured while manufacturing the first color resist layer, so that the first color resist layer and the second color resist layer can be manufactured through just three color resist processes. Compared with the manufacturing method of the display panel provided in the second embodiment, manufacturing steps in this embodiment of the present invention are fewer, and a production capacity and efficiency of a production line are further enhanced.

In other embodiments of the present invention, color collocation among the plurality of color resist blocks arranged in stack is not limited, and the color collocation among the plurality of color resist blocks can be readjusted according to production requirements. For example, arranging a green color resist block on a red color resist block, arranging a blue color resist block on a green color resist block, or other different collocation methods, and adjusting a manufacturing sequence among the plurality of color resist blocks of different colors according to the color collocation among the plurality of color resist blocks. However, structures of layers of the color filter substrate and the display panel and manufacturing method thereof are similar to those provided in the first embodiment to the third embodiment of the present invention, and will not be reiterated herein. Based on the embodiments of the present application, other embodiments which can be obtained by a skilled in the art without creative efforts fall into the protected scope of the present application.

Although the present invention herein has been described with reference to particular embodiments, it should be understood that these embodiments are merely illustrative of the principles and applications of the present invention. It is therefore to be understood that numerous modifications can be made to the illustrative embodiments and that other arrangements can be devised without departing from the spirit and scope of the present invention as defined by the appended claims. It will be appreciated that the various dependent claims and the features set forth therein can be combined in different ways than presented in the initial claims. It will also be appreciated that the features described in connection with individual embodiments can be shared with others of the described embodiments.

What is claimed is:

1. A manufacturing method of a display panel, comprising:
providing a substrate layer;
manufacturing a black matrix on the substrate layer and forming an opening in the black matrix;
forming a first color resist layer filled in the opening and covering the black matrix;
forming a second color resist layer corresponding to the black matrix on the first color resist layer; and
forming a spacer on a position of the second color resist layer corresponding to the black matrix, and forming a protective layer corresponding to the opening on the first color resist layer simultaneously;
wherein when forming spacer on the second color resist layer, a step of forming the protective layer corresponding to the opening on the first color resist layer simultaneously comprises the following steps:
forming a transparent photocurable material layer on the first color resist layer and the second color resist layer;
providing a halftone mask, wherein the halftone mask is provided with a first light-transmitting hole, a second light-transmitting hole, and a third light-transmitting hole, the first light-transmitting hole and the second light-transmitting hole correspond to the black matrix, the third light-transmitting hole corresponds to the opening, and a light transmittance of the first light-transmitting hole is less than a light transmittance of the second light-transmitting hole and a light transmittance of the third light-transmitting hole; and
patterning the photocurable material layer through the halftone mask, forming a main support column at a position on the photocurable material layer corresponding to the first light-transmitting hole, forming an auxiliary support column at a position on the photocurable material layer corresponding to the second light-transmitting hole, and forming the protective layer at a position on the photocurable material layer corresponding to the third light-transmitting hole.

2. The manufacturing method of the display panel according to claim 1, wherein the light transmittance of the second light-transmitting hole is same as the light transmittance of the third light-transmitting hole.

3. A manufacturing method of a display panel, comprising:
providing a substrate layer;
manufacturing a black matrix on the substrate layer and forming an opening in the black matrix;
forming a first color resist layer filled in the opening and covering the black matrix;
forming a second color resist layer corresponding to the black matrix on the first color resist layer; and
forming a spacer on a position of the second color resist layer corresponding to the black matrix;
wherein the black matrix comprises a first opening region, a second opening region, and a third opening region, the first opening region is provided with the first opening, the second opening region is provided with the second opening, the third opening region is provided with the third opening, and a step of forming the first color resist layer filled in the opening and covering the black matrix comprises:
covering a first color resist material on the black matrix;
providing a first mask, wherein the first mask is provided with a fourth light-transmitting hole and a fifth light-transmitting hole, a projection of the fourth light-transmitting hole on the substrate layer overlaps with a projection of the first opening region on the substrate layer, and the fifth light-transmitting hole is arranged corresponding to the second opening region and the third opening region; and
patterning the first color resist material through the first mask, so as to form a first color resist block in the first opening region and form a second color resist block at a position corresponding to the fifth light-transmitting hole, wherein the second color resist block is located on the black matrix between two adjacent second openings, and located on the black matrix between two adjacent third openings.

4. The manufacturing method of the display panel according to claim 3, wherein a step of forming a second color resist layer corresponding to the black matrix on the first color resist layer comprises:
covering a second color resist material on the first color resist layer;
providing a second mask, wherein the first mask is provided with a sixth light-transmitting hole and a seventh light-transmitting hole, a projection of the sixth light-transmitting hole on the substrate layer overlaps with a projection of the second opening region on the substrate layer, and the seventh light-transmitting hole is arranged corresponding to the first opening region; and
patterning the second color resist material through the second mask, so as to form a third color resist block in the second opening region and form a fourth color resist block at a position corresponding to the seventh light-transmitting hole, wherein a projection of the fourth color resist block on the substrate layer is located on the black matrix between two adjacent first openings, and the third resist block covers the second color resist block in the second opening region.

* * * * *